Nov. 15, 1955

P. G. EXLINE 2,723,560

PARACHUTE TENSIOMETER

Filed May 12, 1953

INVENTOR.
PAUL G. EXLINE
BY Wade Koontz AND
Frederick W. Cotterman
ATTORNEYS

Nov. 15, 1955  P. G. EXLINE  2,723,560
PARACHUTE TENSIOMETER
Filed May 12, 1953  7 Sheets-Sheet 2
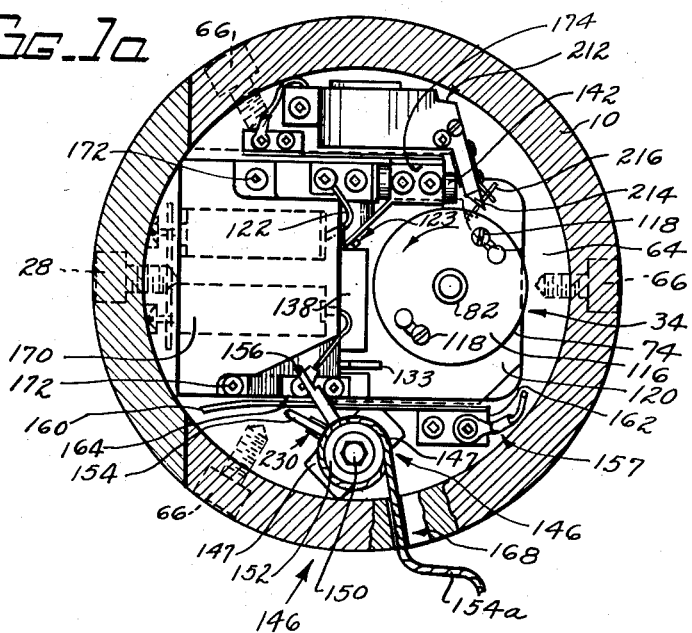
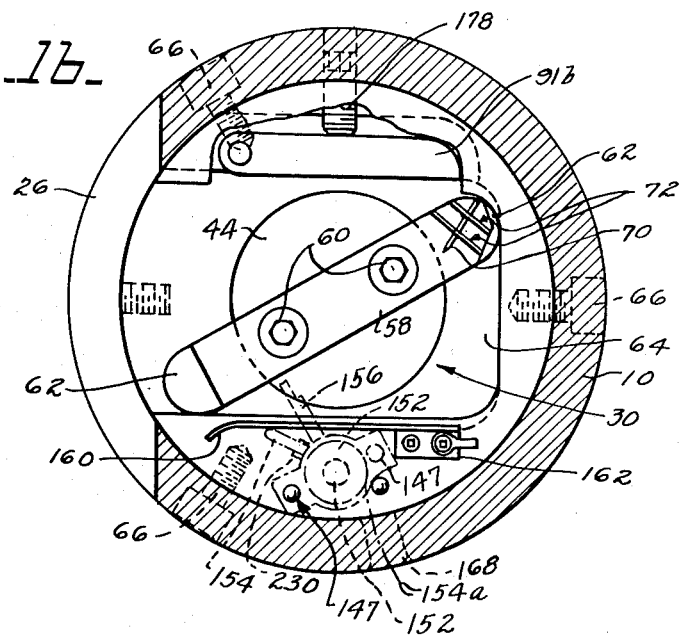
INVENTOR.
PAUL G. EXLINE
BY
ATTORNEYS Nov. 15, 1955  P. G. EXLINE  2,723,560
PARACHUTE TENSIOMETER
Filed May 12, 1953  7 Sheets-Sheet 3

INVENTOR.
PAUL G. EXLINE
BY Wade Looney
Frederick W. Cotterman
ATTORNEYS

Nov. 15, 1955     P. G. EXLINE     2,723,560
PARACHUTE TENSIOMETER

Filed May 12, 1953         7 Sheets-Sheet 4

INVENTOR.
PAUL G. EXLINE
BY Wade Komitz AND
Frederick W. Catterman
ATTORNEYS

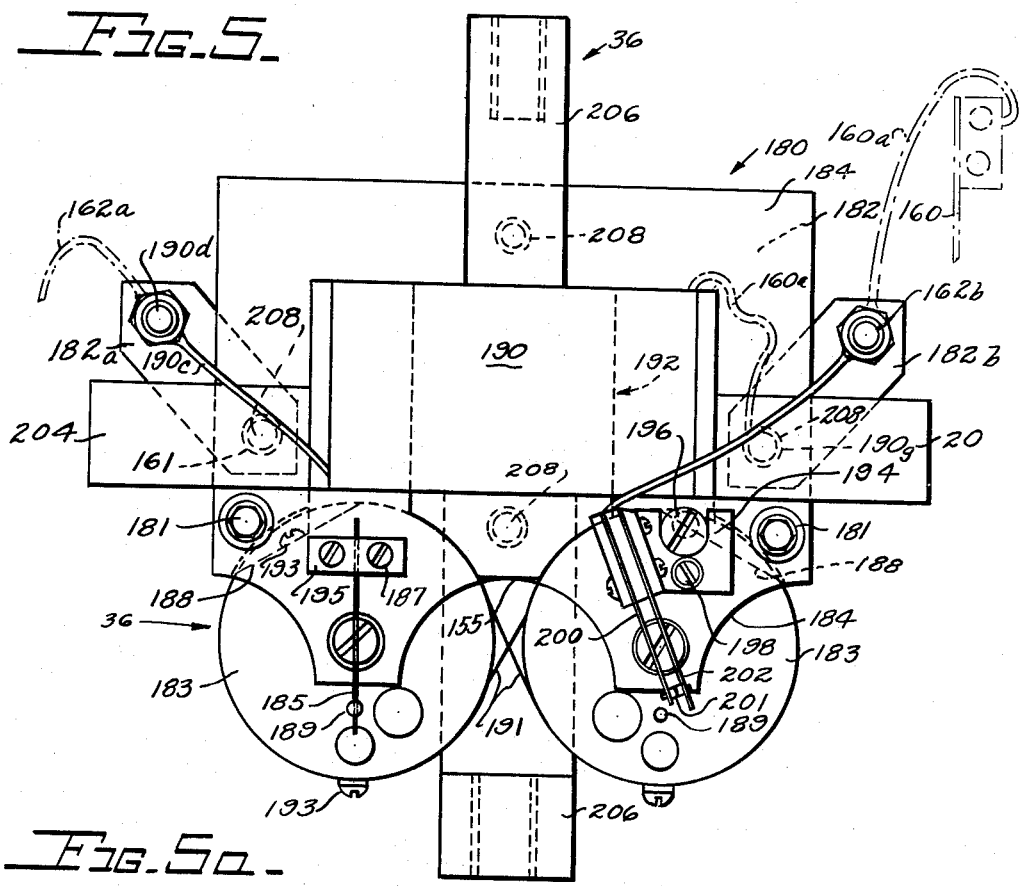
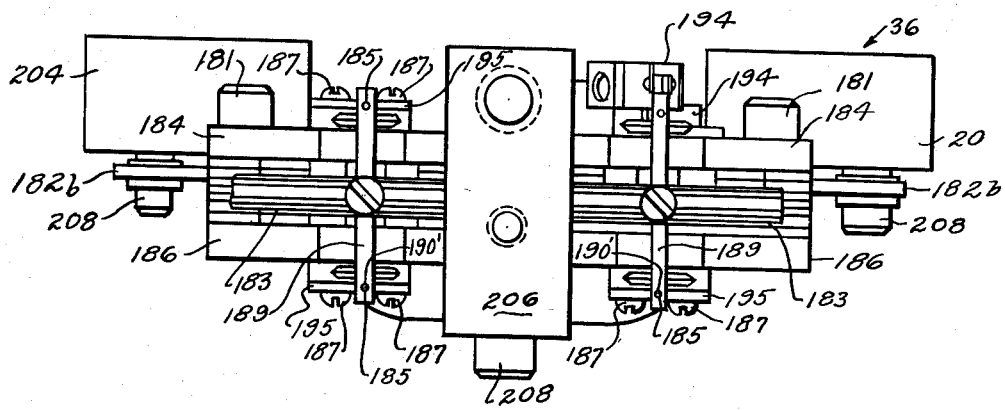

Nov. 15, 1955   P. G. EXLINE   2,723,560
PARACHUTE TENSIOMETER
Filed May 12, 1953   7 Sheets-Sheet 6

INVENTOR.
PAUL G. EXLINE
BY Wade Loomis AND
Frederick W. Cotternhan
ATTORNEYS.

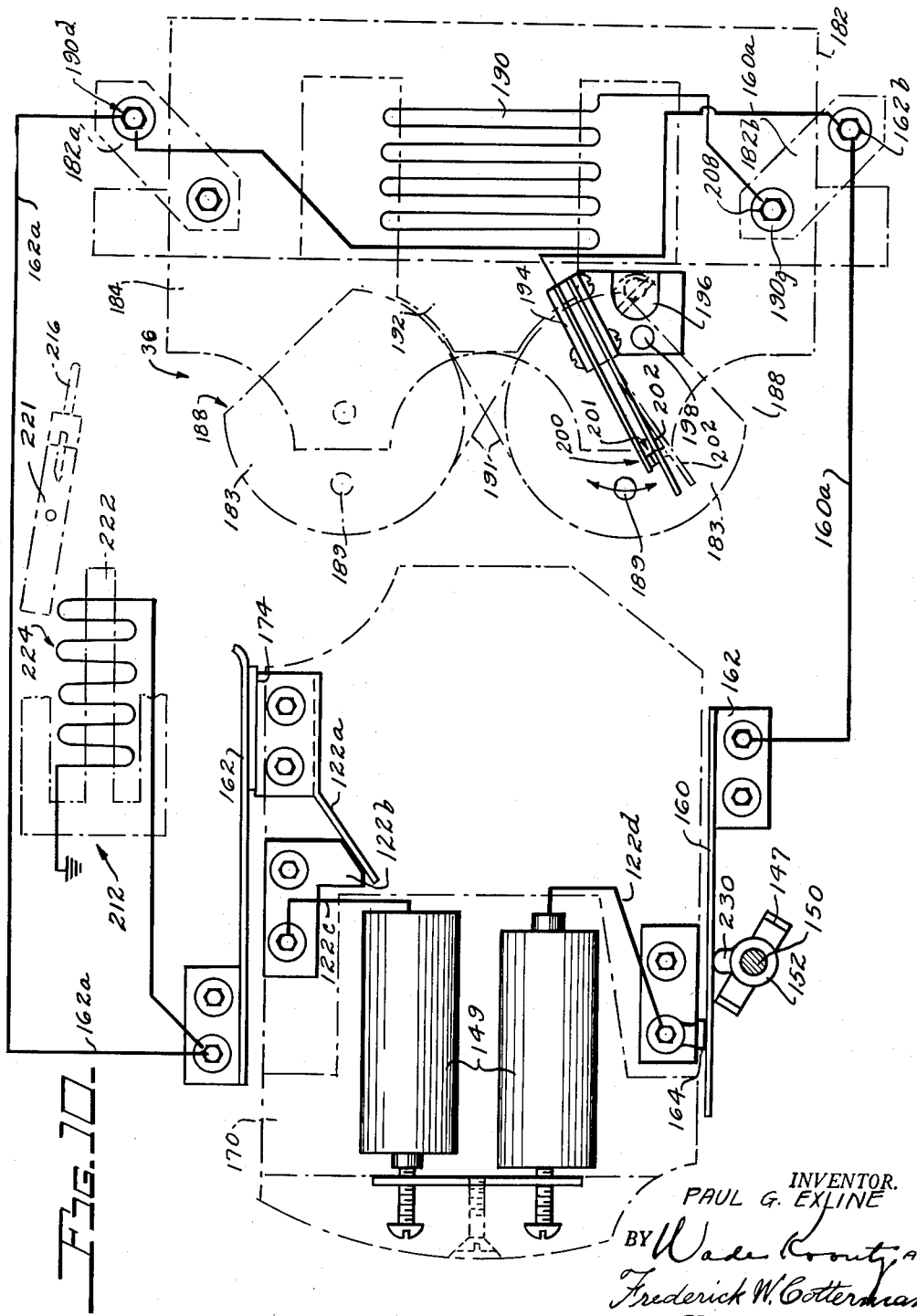

United States Patent Office 2,723,560
Patented Nov. 15, 1955

2,723,560

PARACHUTE TENSIOMETER

Paul G. Exline, Tulsa, Okla., assignor to the United States of America as represented by the Secretary of the Air Force Application May 12, 1953, Serial No. 354,604

6 Claims. (Cl. 73—141)

This invention relates to tensiometers it being a form of device for recording forces of short duration. It is particularly useful in recording the opening shock forces of parachutes during experimental work thereon.

Roughly, the complete assembly of the device comprises, in a single unit, a means for receiving, for measuring, and for recording the shock incident to the opening of a parachute in the course of its descent.

Subject tensiometer is constructed and arranged to be connected between the load suspension harness of a packed parachute and a dummy load and carried on an aircraft with manual means to initially set the device to an operable position and automatic means controlled by the dropping of the assembly, i. e., the packed parachute, the tensiometer and the dummy or a predetermined load, to initiate operation of the device automatically coincidentally with or just prior to the opening of the parachute.

Additionally, means are included to measure and accurately make a permanent record of the intensity and duration of the shock or pull forces between the parachute and its attached load incident to the opening and deceleration of the parachute and its suspended load.

The principal object of the invention is to provide a simple and inexpensive apparatus which will accurately measure and permanently record the time interval and magnitude of the several qualities above indicated.

I attain this and other objects in the device hereinbefore described and illustrated in the drawing wherein:

Fig. 1a is a horizontal section through the device, taken approximately on the line 1a—1a of Fig. 1, part of this view, the housing, being shown in section and the other parts in elevation.

Fig. 1b is another horizontal section through the device taken approximately on a line 1b—1b of Fig. 1, the housing being shown in section and the remainder of the parts being shown in elevation.

Fig. 4 is a plan view of the recorder unit which is removably positioned and secured within the main housing. Its function is to record a permanent record of the shock, its amplitude and duration, caused by the deceleration forces between parachute and load during and following the opening of the parachute.

Fig. 4a shows the escapement drive means for the recorder assembly which includes the gear train, the chart drum drive, a circuit breaking means, and the escapement. Its function is to control the predetermined speed of the drum which carries a removable chart upon which the record is made and break the operating circuit after the record is made.

Fig. 4b is a side elevation of the recorder unit as it appears when removed from the main housing.

Fig. 5 is a top plan view of the electrical make and break oscillator mechanism as it appears when removed from the main housing. Its function is to control the vertical movement or vibration of the time stylus at a predetermined uniform rate.

Fig. 5a is a side view of the device shown in Fig. 5.

Fig. 10 is a detail wiring diagram of the electrical circuits between the time marker and oscillator magnets and make and break contacts of the oscillator unit.

Like reference characters refer to like parts throughout the several views.

Master assembly

Figure 1:
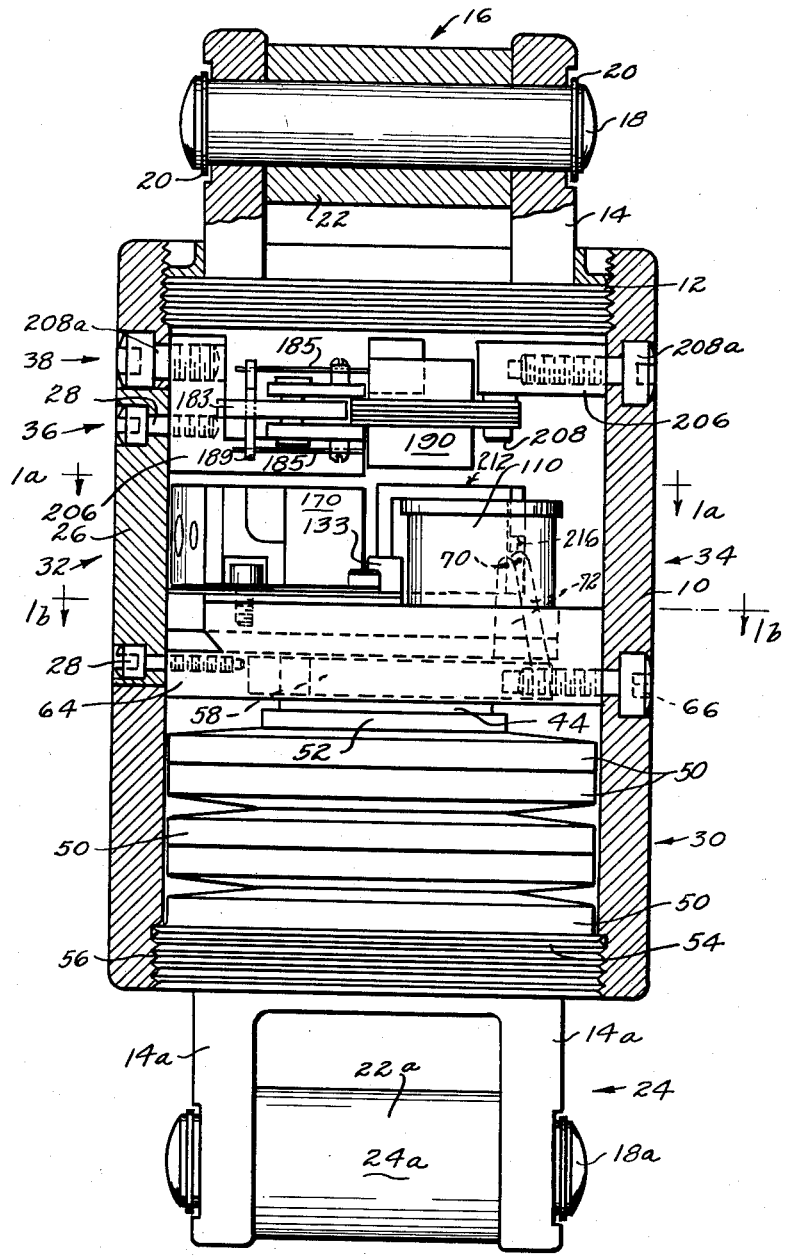
Fig. 1 is a vertical axial section through the housing of an apparatus embodying the invention, the contents of the housing comprising a series of related and cooperatively connected subassemblies which appear somewhat schematically within the housing in elevation.

Referring more particularly to Fig. 1, which shows the main assembly, a cylindrical housing 10 with axis vertical has the upper end closed by an externally threaded end plate 12 from which integral arms 14 extend upwardly to form the sides of a clevis 16. A clevis pin 18 is supported in arms 14 and is held against movement in the direction of its axis by spring rings 20. A clevis sleeve 22 is held between the arms 14 on pin 18. This structure comprising parts 12, 14, 18, 20 and 22 will hereinafter be collectively referred to as the upper clevis 16. A somewhat similar structure closes the lower end of the housing 10 and may be referred to as the lower clevis 24. In operation the conventional suspension harness, usually associated with a parachute, loops around the sleeve 22 to support the test device. An appropriate harness may be provided and looped around the lower clevis sleeve 24a for connecting and suspending a predetermined or dummy load.

For convenient access to the recording mechanism within the housing 10 a window or removable closure plate 26 is provided, removable by removing the screws 28. The several subassemblies, i. e., the spring assembly 30, the recorder assembly 32, the chart drum assembly 34, the oscillator assembly 36, and the time marker assembly 38 are shown only in full line views and somewhat schematically, approximately in their respective cooperative positions in Fig. 1.

Force spring assembly

Figure 2:
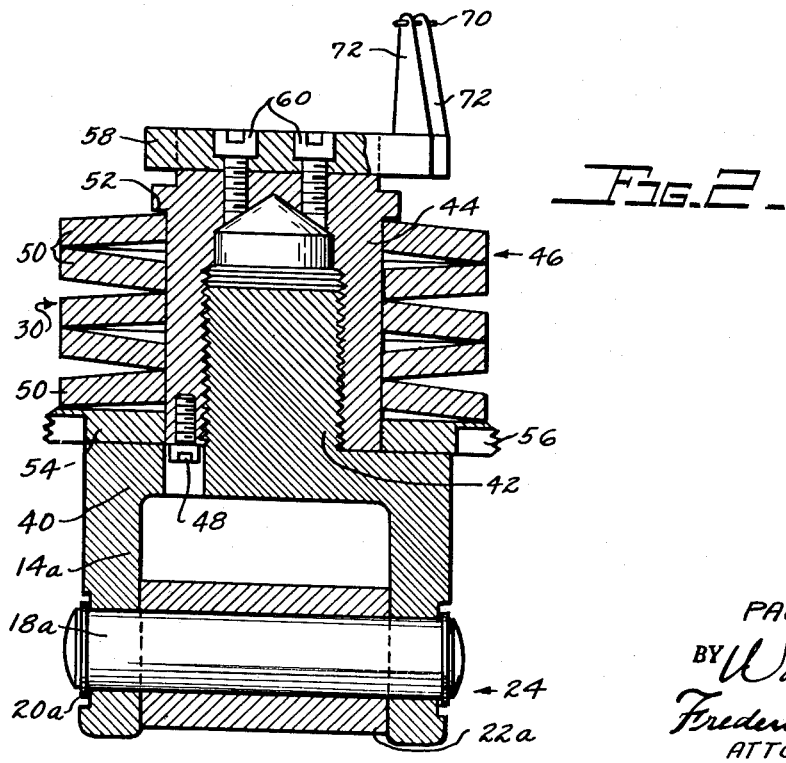
Fig. 2 is a vertical axial section through one of the subassemblies of the device, this subassembly being designated the spring assembly or yieldable load connecting assembly and its function being to indicate the intensity of the shock or deceleration forces incident to the opening of the parachute after release from an aircraft.

The force spring subassembly 30, shown in full line view in the lower end of Fig. 1, is shown in axial vertical section in Fig. 2. The clevis 24, hereinbefore referred to as the lower clevis, has parts 14a, 18a, 20a and 22a which are like 14, 18, 20 and 22 of the upper clevis. It differs, however, in that from the clevis plate 40 of the lower clevis, an integral externally threaded stud 42 extends upwardly into an internally threaded pull rod 44, whereby initial slight pre-load may be applied to a force spring 46 by adjustment of the mating threads. A lock screw 48 may be tightened to maintain the adjustment.

The force spring 46 consists of a stack of dished spring steel discs or spring washers 50 with the central portion removed so as to slide over the pull rod 44. The pull rod 44 is shouldered at 52 to engage the inner periphery of the upper disc 50. The discs 50 are stacked one with the dished side up and the next with the dished side down and so throughout the stack. The bottom disc 50 is placed with the dished side down so that its outer periphery rests on a thrust plate 54. Threads 56 on the thrust plate 54 screw into corresponding threads in the bottom of the housing 10 and thereby anchor the thrust plate to the housing whereby, when the dummy load or a predetermined load pulls the lower clevis 24 downward, the thrust plate remains stationary with respect to housing 10, whereby the dished springs 50 are flattened and the pull rod 44 moves downwardly in proportion to the applied load. In operation, the stud 42 is screwed into the pull rod 44 until a slight preload is applied to the springs by thus decreasing the distance between the shoulder 52 and the upper surface of the clevis plate 40.

The force stylus bar 58 is received in a close fitting slot in the upper end of the pull rod 44 and is fastened therein by two screws 60.

The outer ends of the stylus bar 58 project radially outward beyond the diameter of the pull bar 44, the outer ends of the stylus bar 58 being slidable in guide slots 62 in a transverse guide plate 64 in the housing 10. Guide plate 64 is fitted into the bore of the housing 10 and is held in place by three circumferentially spaced screws 66 extending radially inward through the housing wall and into the edge of the guide plate. (See Fig. 1b.)

The force stylus 70 is mounted in the upper ends of two cantilever springs 72 which are soldered at their lower ends into slots in a projecting end of the bar 58 near one end thereof. The stylus 70 is press fitted in aligned holes provided in the free ends of the cantilever springs 72 and after being correctly located is then soldered to the cantilever springs 72.

The stylus location in the springs 72 is somewhat critical in that the springs and stylus must deflect slightly when the chart drum, hereinafter described, is placed in operative position, to give a slight force of the stylus point against the recording surface of the chart. The stiffness of the springs is selected to give a natural frequency high enough to prevent any vibration in resonance with any imposed vibrations of the housing 10 likely to be encountered in the aircraft before ejection or release of the device therefrom.

*Chart drum assembly*

Figure 3:
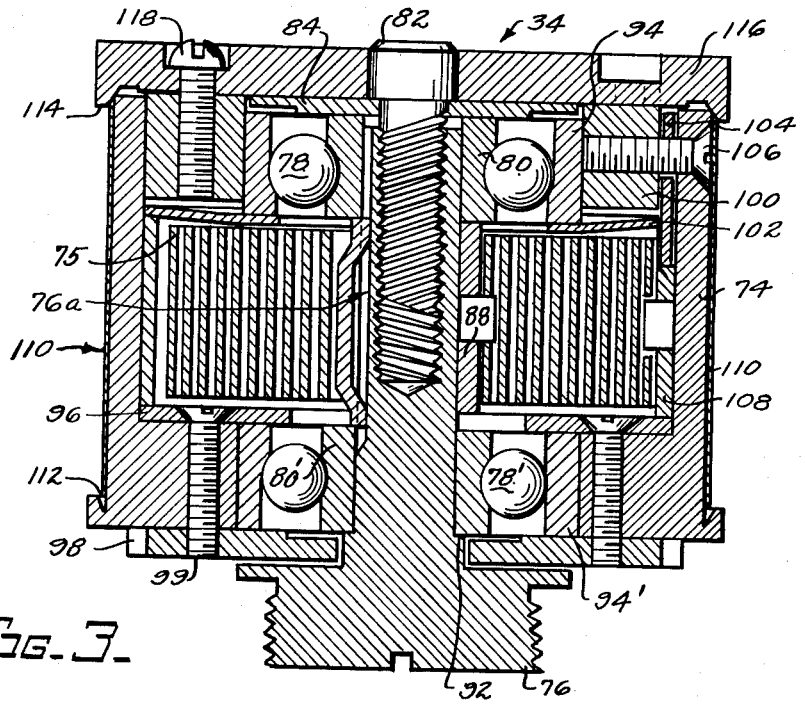
Fig. 3 is a vertical axial section through the recorder chart drum assembly and the spring drive means whereby rotative force is applied to the chart drum upon which a recording chart is mounted, so as to provide the record.

The chart drum subassembly is shown in Fig. 3. The principal requirement of this subassembly is that it functions as a means of holding a recording chart in a true cylindrical shape capable of rotation on its own axis without shake or play. The moment of inertia of the rotating system should be sufficiently low compared to the spring torque so as to prevent the possibility of back lash or slowing down of the clock mechanism hereinafter described, due to angular accelerations applied to the system externally by the parachute during opening shock.

Referring to Fig. 3 of the drawing which shows the chart drum assembly as designated by the numeral 34, the chart drum 74 is supported on the arbor 76 by two annular contact bearings 78 and 78'. The inner races 80 and 80' of both bearings are firmly clamped by means of the screw 82 acting through the bearing retainer plate 84, the upper bearing 78, the spring arbor 88, the lower bearing 78' and a shoulder 92 on the drum arbor 76. The outer race 94' of the lower bearing 78' is clamped between the bearing plate 96 and the drive gear 98 by screws 99. Screws 99 also connect drive gear 98 to drum 74.

The outer race 94 of the upper bearing 78 is a sliding fit in the bearing guide plate 100 and is forced upward by a disc spring 102. The disc spring 102 normally applies an axial force on the bearing of about 12 pounds but also prevents either binding or looseness due to differential expansion of the different members through a wide temperature range.

The lower bearing 78' is capable of taking thrust in a downward direction on the outer race 94'. This is the direction in which force is developed by the supported parts during opening shock. The capacity of the bearing is such that it can easily withstand accelerations in this direction of well over 500 G's. A sufficient force in the opposite direction may cause deflection of the disc spring 102 and allow a relative movement between the chart drum 74 and the drum arbor 76. The mass of the supported parts is less than $\frac{1}{10}$#, and with a spring force of over 10# it would require an acceleration in the other direction of at least 100 G's to cause such motion.

In order to facilitate removal and replacement of the spring 75, the spring assembly may consist of the drum spring 108, the spring 75, and the spring arbor 76. This assembly can be removed and replaced intact. The spring arbor 76 has a keyway 76a which receives a key on the drum arbor, and rotation of the spring drum 108 relative to the chart drum 74 is prevented by the spring key 104, held by a screw 106 through the chart drum 74 and fitting into a slot in the spring drum 108. The spring 75 itself is an easily available commercial article which can be obtained readily at most clock and watch repair stores.

The chart 110 is made of a polished aluminum foil sheet or strip approximately .003" thick. It is a strip preformed to a cylindrical shape slightly shorter in circumference than the drum surface, so that when it is slipped in place it can rest against the circumference of the drum without overlapping at its ends. It is firmly clamped in place along its opposite edges and retained against the drum surface by the annular groove 112 at the bottom edge of the chart drum 74 and by the overhanging lip 114 around the chart retainer plate 116. The chart retainer plate 116 is held in place by two screws 118, which operate in arcuate slots in the retainer 116 in a well known manner. To remove the retainer plate 116, it is necessary to back off the screws 118 several turns only, rotate the retainer plate 116 several degrees and pull it off over the screw heads.

The chart 110 is made with a width several thousandths of an inch greater than the length of the chart drum, so that clamping down the chart retainer 116 will apply a slight compression to the edges of the chart. It is, however, possible to crimp the chart if the retaining screws are pulled down too tightly, but very little experience is required to determine the proper tension to apply to these screws 118.

*The recorder assembly*

The recorder unit is shown in Figs. 4, 4a and 4b. This assembly includes the chart drum assembly 34, Fig. 3, and the escapement assembly in Fig. 4a. The chart drum assembly is shown in full line views in Figs. 1 and 1a and in section in Fig. 3. It is identified by the numeral 34 and is described with reference thereto.

A base plate 120 carries the chart drum assembly 34 and the escapement mechanism. The escapement mechanism comprises the drive gear 98 hereinbefore shown in Fig. 3 as attached to the chart drum 74. The remainder of the gear train consists of the idler gear 122 which meshes with the drive gear 98, the ratchet gear 124, the third gear wheel 126, the star wheel 128, and the pallet 130. A pinion 132 drivably connects the ratchet gear 124 to the idler gear 122, another pinion 134 drivably connects the third wheel 126 to the ratchet gear 124 and still another pinion 136 drivably connects the third wheel 126 to the start wheel 128.

The pallet plate 138 is kept at a proper distance above the base plate 120 by the right and left rails 140 and 142 to provide suitable space for the escapement mechanism. Screws 144 and dowels 145 hold the rails positioned on the base. The escapement closely resembles that of the clock mechanism of common practice except that it is more rigid and shockproof and less subject to unwanted distortion. The lower pivot holes for the escapement gears are in the heavy base 120 while the upper pivot hole for the pallet 130 is located in a thin necked boss (not shown) which is formed by cutting away surrounding metal in the pallet plate 138. This provides a conventional means for altering the distance between the pallet and star wheel pivots for obtaining correct engagement between the pallet pins and the star wheel. It is also possible to make minor adjustments in the rate of the mechanism by bending this boss slightly forward or backward.

The rate of the escapement drive is determined largely by the moment of inertia of the pallet about its axis, and to a lesser amount by the degree of engagement of the pallet pins with the star wheel 128, and by the torque applied by the drive pinion 98.

Two rates are available, a ten second drive and a twenty second drive. The recorders are initially adjusted to give these rates within close limits.

The idler gear 122 contains a stop screw 123 which is used to limit its travel to slightly less than one complete revolution. This stop screw can be removed through a hole in the base and can be placed in any one of a plurality of equally spaced holes 125 in the idler gear 122. If it is necessary to remove the chart drum 74 the stop screw 123 may be removed and the spring allowed to unwind completely before removing the drum and drum arbor.

After replacing the drum, the spring may be rewound by manual rotation of the chart drum 74 in a clockwise direction until the correct torque is developed and the stop screw 123 then replaced in the tapped hole nearest the access hole in the base.

The stop screw 123 engages spring contact stop blade 122a normally in contact with a contact plate 122b. The contacts are separated by the pin 123 at the end of the recording cycle.

The escapement mechanism is started and stopped by means of a pallet release member which is in the form of a sliding bar 127 held to the inside of the right rail 140 by screws 129. This bar carries on its inside face a bent spring metal strip 131 which normally bears against the tail of the pallet as shown, preventing it from oscillating. The sliding bar 127 is slotted longitudinally at 127a for a free fit on the screws 129 whereby the bar may be slid to the right to allow the pallet to oscillate and to the left to hold the pallet from oscillation.

*Trigger mechanism*

An upward extension 133 at the end of the sliding bar 127 cooperates with a trigger mechanism 146 to release the pallet 130 automatically. This trigger mechanism is best shown in Fig. 1a where it cooperates with a starter switch mechanism 157 to direct the electric current to the winding of the oscillator mechanism 36 and to the winding of the time marker assembly 212.

The trigger mechanism includes a hub 152 having a rectangular block 147 resting on the upper surface of the guide plate 64 and a shoulder screw 150 extending therethrough upon which the hub 152 is rockable. Hub 152 has two integral arms 154 and 156. Arm 154, rotated clockwise by a pull cord 154a will rotate the hub 152 and the arm 156 an equal amount since both arms extend from the same hub 152. An insulated spring metal contact or switch blade strip 160 extends from an insulated block 162 fixed on guide plate 64 and is movable to make contact at a contact point 164. When the switch blade 160 contacts the contact point 164 an electrical current from a current source may be directed to the coils 190 and 224 of the several electromagnets.

Conventional ball detents (not shown) are provided between the bottom of the rectangular block 147 and the upper surface of the guide plate 64 to yieldably arrest rotation of the trigger hub 152 at the correct on and off positions. The spring tension on the detent balls is preferably adjusted to require a minimum pull of 5# on the pull cord 154a before rotating the trigger and a maximum pull of 20#. The corners of the rectangular block 147 strike the inside of the housing 10 and thus assist the detent means in preventing rotative overtravel in either direction. A small hole is drilled in the side of the hub 152 near the bottom and a projecting insulation pin or cam 230 driven in with rounded end extending whereby the switch blade 160 is cammed into contact with contact 164 when the hub 152 is rotated clockwise by the pull cord 154a.

The first or upper arm 154 acts as an anchor to the end of the pull or break cord 154a and also may be used for manually returning the trigger to the initial or "set" position before withdrawing the recorder assembly 34 from the cage 10, after a record has been made. The second arm 156 projecting from the hub 152 has a notch in the outer end thereof which engages the upwardly extending end 133 of the escapement release slide bar 127 to thereby withdraw and hold the strip 131 from contact with the pallet 130 when the hub 152 is rotated clockwise by pull on cable 154a. The trigger mechanism or hub 152 is rotated about one sixth turn clockwise to effect the required mechanical and electrical connections for release of the escapement and operation of the tensiometer. This may be accomplished by bringing the pull or break cord 154a in through a hole 168 in the main housing 10, wrapping it several turns anti-clockwise around the hub 152 and fastening a looped end of the cord 154a over the upper arm 154.

The outer or other end of the cord 154a is secured to a point on the aircraft which is carrying the device and provided with sufficient slack so that when the device is dropped and the slack is taken up the hub 152 is caused to rotate, whereby the second arm 156 is rotated, thereby engaging the upwardly extending end 133 of the sliding bar 127 to move it rightwise until it withdraws the end of the bent metal strip 131 from the pallet 130, allowing the pallet to oscillate. The insulated cam arm 230, being fixed in the hub 152 also rotates therewith and closes the switch strip 160 against the contact 164. This completes a circuit through the oscillator coil of the oscillator assembly 36 which circuit is interrupted periodically as will hereinafter appear.

The power supply assembly consists of two miniature dry cells 149 held in a battery case 170 attached to the top of the pallet plate by mounting screws 172. The batteries are connected in series from an insulated terminal 174 on the left rail 142 through the battery to the insulated terminal 164 on the top of the right rail as shown in Figs. 4 and 10. A flexible conductor 162a connects the terminal 174 through spring contact strip 162 to one end of the oscillator magnet coil 190.

The electrical circuit is broken at the end of the recording cycle when the removable stop pin 123 on the idler gear 122 separates the spring contact blade 122a from the contact plate 122b, the contact blade 122a being insulated from left rail 140 and is part of contact 174 and is connected to one terminal of battery through flexible conductor 122c. Flexible conductor 122d connects other battery terminal to contact 164.

The edges of the recorder base plate 120 are beveled to fit the dovetailed edges of the guide plate 64 into which the recorder assembly 34 is slidable. A gib 91b is pivoted at one end (Fig. 1b) and is swung inward into position and firmly pressed against the left-hand dovetail by a single screw 178 to secure the recorder unit 34 in the housing 10.

*The oscillator assembly*

The oscillator assembly 36 is shown in Figs. 5 and 5a (and 10). The function of the oscillator is to open and close the circuit to the time marker at predetermined uniform intervals to cause the time marker stylus 216 to record selected predetermined short time intervals on the recorder chart 110.

The oscillator is electromagnetically operated and particular attention should be given to make it free of inertia or acceleration effects in any direction.

The oscillator frame 180 consists of a stack of E form transformer laminae 182 with two soft iron discs 183 mounted for rotation with respect to the laminated frame 180. The laminated core is milled out at the three open ends of the E with a radius which leaves a clearance between the soft iron discs 183 and the frame 180 of from .005" to .010". Suspension top and bottom plates 184 and 186, attached to the frame 180 by screws 181, rotatably support the discs against axial displacement. Each disc is mounted on pivot bearings so as to maintain the air gap. A portion of the periphery on each disc is cut away as at 188 at such a position that the disc comes to rest in its home position with the cut-away portion 188 of the periphery of the disc under the milled out portion of the two outer limbs of the E form transformer core, whereby, in the rest position the air gap is greatly increased and the magnetic lines proportionally reduced.

An electromagnetic coil 190 is form wound and placed over the middle limb 192 of the E frame and fastened in any suitable manner. When current is passed through the coil 190 the magnetic lines of force will cause each disc 183 to rotate in such direction as will produce the minimum air gap and when current is interrupted will allow the discs to be spring rotated toward their home position.

The discs are compelled to rotate in opposite directions by means of two crossed flexible connector wires or strings 191 each string having one of its ends attached by a screw 193 to one of the discs and the other end similarly fastened to the other disc.

Return of the discs to the home position is effected by means of restoring springs 185. These springs consist of straight lengths of high alloy wire clamped between metal blocks 195 to the suspension plates by clamping screws 187. A spring post 189 is pressed into each disc 183, the posts 189 having their axes parallel to the disc axis.

The free end of each restoring spring 185 is passed through a tiny hole 190' near the outer end of the spring post 189. Holes 190' are slightly larger than the spring wire diameter in order that no end constraint is applied to the restoring spring 185.

As the angular deflection of the discs 183 increases from zero, the length of arc between the spring post 189 and the return springs 185 must increase slightly so that, as the discs oscillate, there is slight relative endwise motion of the springs in the holes 190' in the spring posts 189. Because each disc is statically and dynamically balanced, a linear acceleration in any direction whatever will have no resultant tendency to cause the discs to rotate or to change their rotation relative to the supporting frame 184—186. An angular acceleration of the housing 10 having a component whose axis is parallel to the axis of rotation of the disc, would tend to cause the discs to rotate relative to their support in a direction opposite to the acceleration imposed on the instrument. This effect would be identical on both discs, tending to cause them to rotate in the same direction. However, since the strings 191 linking them together constrain them to rotate in opposite directions the effect of the angular acceleration is neutralized.

A metal angle bracket 194 is secured to the upper suspension plate 184 by screw 198 an eccentric adjustment cam 195 being provided for adjustment of the bracket. The upwardly extending portion of the angle bracket 194 supports two insulatedly separated switch blades 200 and 202. Blade 200 is somewhat shorter than 202 and carries a contact point 201 which is normally closed on to the blade 200. The blade 202 is preferably grounded to frame through bracket 194.

Mounting lugs 204 and 206 are attached by screws 208 to the oscillator assembly, the lugs in turn being fastened by mounting screws 208a extending radially through the wall main housing 10 into the lugs.

Terminal insulator blocks 182a and 182b are secured to the mounting lugs 204 by screws 208. One terminal of magnet coil 190 is connected by conductor 190c to terminal 190d, which is connected by conductor 162a to contact blade 162. The other terminal of magnet coil 190 is grounded to frame at 190g. The conductor 160a, through insulated terminal 162b connects switch blade 160 to the short contact blade 200. The long contact blade 202 is grounded through bracket screw 198 to frame.

Time marker assembly

Figure 6:
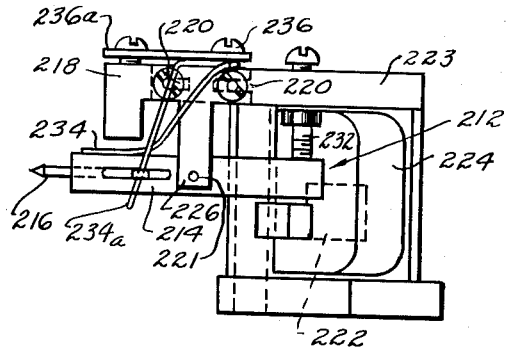
Fig. 6 is an angular elevation of the time marker assembly.
Figure 7:
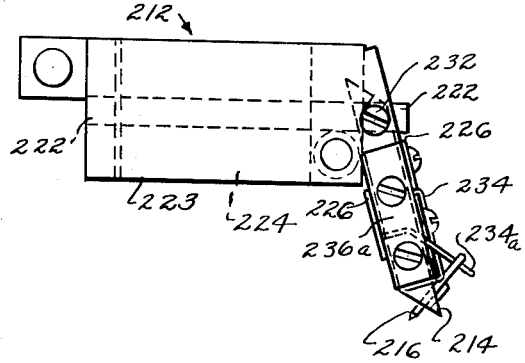
Fig. 7 is a top plan view of the time marker assembly.
Figure 9:
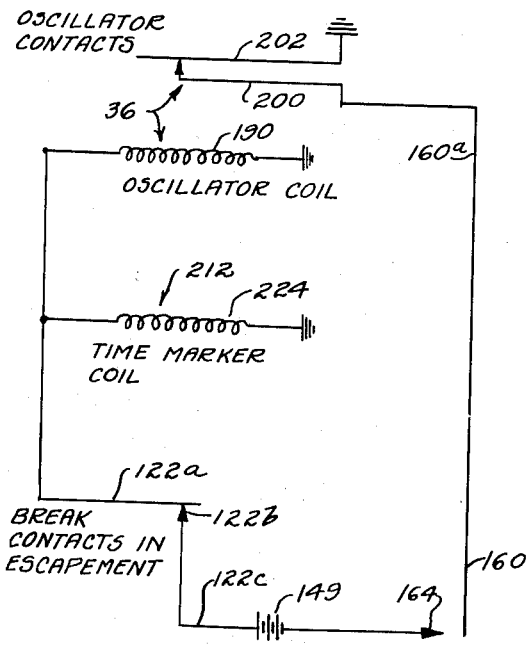
Fig. 9 is a schematic diagram of the general electrical circuits.
Figure 8:
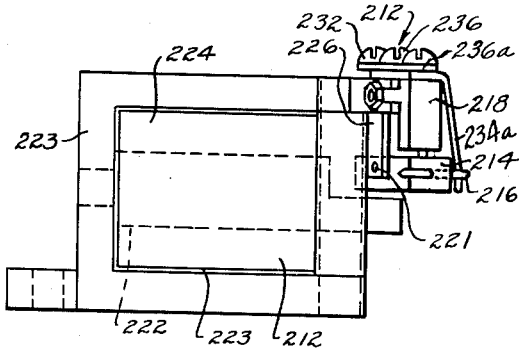
Fig. 8 is a side elevation of the time marker assembly. Its function is to rock the time marker stylus up and down on the chart drum and record the time and duration of the opening shock and deceleration forces in comparison to the extent or ampltiude of said forces.

Visible through the window or opening 26 and mounted on the top of the guide plate 64 at the left side of the housing 10 is the time marker assembly 212 shown in detail in Figs. 6 to 8. The function of this instrument is to impress time interval markings upon the chart 110 during the rotation thereof coincidentally with the scribing of the force recording line thereon. To this end a simple time marker device 212 is provided and its magnet or operating coil is connected in parallel with the oscillator device coil 190 so that oscillations of the oscillator discs 183 and making and breaking of contacts 201 causes the time marker armature 214 and stylus carried thereby to rock up and down. The time marker device comprises a box shaped field magnet frame 223 the box being open at the sides and at one end and with a core 222 supported longitudinally at the closed end of the frame. A single magnet coil 224 is carried on the core 222 between the sides of the frame.

An integral bracket arm 218 extends diagonally from one of the top sides of the box-like magnet frame. Bracket 218 carries a pair of spaced adjustable pivot plates 226 between which an armature 214 is hinged by a pivot 221. The pivotal point 221 of the armature 214 is about midway of its length, the one end of the armature 214 lying alongside the end core 222 and the other end carrying a stylus 216.

The time marker stylus 216 is so located in the housing 10 that it presses lightly against the aluminum foil chart 110 on the chart drum 74 directly above the force measuring stylus 70. A timing mark line is thus scribed on the chart coincidentally with the scribing of the force line thereon. The plates 226 have elongated mounting slots 220 whereby correct adjustment may be made to place the stylus point in the desired location on the chart relative to the point of the force stylus 70.

The amplitude of vibration of the armature 214 and stylus point 216 is limited by the stop screw 232. A wire spring 234 has one of its ends fastened to the screw 236 and the other end impinges the upper surface of the end of the armature 214 whereby the armature and stylus 216 assume the position shown in Fig. 6 when the electromagnet 224 is not being energized. A second fine spring wire 234a is clamped under clamp plate 236a and its free end passes through a hole in the stylus 216, sliding the stylus outwardly in a guide opening in the end of the armature bar 214.

Operation

The operation of the device herein disclosed may preferably be substantially as follows:

With the upper clevis 16 attached to a parachute harness (not shown) and the lower clevis attached to a dummy or predetermined load (not shown), and with the pull or break cord 154a extending through the hole 168 in the housing 10 and wrapped several turns counterclockwise around the trigger hub 152 and tied or looped to the arm 154 of the trigger mechanism, the other end of the cord being secured to the aircraft making the test, and with the trigger hub 152 turned to its limit counterclockwise, the parachute carried by the aircraft making the test, together with the attached tensiometer and the dummy load, is dropped from the aircraft.

When the slack in the break cord is eliminated and tightens it first rotates the trigger hub 152 about forty-five degrees clockwise (viewed from above) which completes an electric circuit through the metal strip 160 and contact 164. The pull cord 154a is now broken by the pull of the falling parachute, tensiometer and load.

As the parachute opens the magnitude and duration of the opening shock is recorded, also variations in the magnitude of the shock are accurately recorded as compared throughout a predetermined measured time interval. The initial pull on the break cord 154a after its slack has been taken out (by the fall of the parachute and load) rotates the trigger hub 152 to cam the switch blade 160 into circuit closing position for closing the two respective circuits to the time marker stylus magnet 212 and the circuit to the circuit making and breaking device or oscillating mechanism magnet 190, this being accomplished by the camming action of the cam projection or short arm 230 on the rotatable trigger hub. At the same instant the long arm 156 moves to impinge the upstanding end 133 of the clock work and escapement release slide bar 127, withdrawing the spring end 131 from the escapement pallet 130, permitting the escapement and force of spring 75 to initiate slow rotation of the chart drum 74 with its thin foil recording chart 110 thereon.

Both stylus needles 70 and 216 are spring pressed against the surface of the foil chart 110 at all times so a graph is being recorded on the rotating chart for a short time period, from 10 to 20 seconds or any time as determined by the escapement, sufficient to cover the entire period of opening of the parachute (in the usual manner) and the application of decelerating forces to the suspended load by the parachute canopy ordinarily termed opening shock forces. As the current from battery 49 energized the magnet coils 224 and 190 the armature 214 is rocked raising the stylus point 216 while in contact with chart 110. Simultaneously the oscillator discs 183 are rotated by the magnet 180 and the spring 185 through the posts 189 are tensioned. The post 189 associated with contact breaker strips 200 and 202 strikes strip 202, separating contact points 201 which breaks current to both oscillator magnet 190 permitting springs 185 to return discs 183 and circuit to time marker magnet 224 is broken allowing spring 234 to depress or rock stylus bar 214. As oscillator discs 183 are returned by spring 185 contacts 201 are again closed repeating the cycle, each oscillation moving the stylus 217 on the chart 110 to indicate an interval of time. Simultaneously the application of load (or pull between parachute and load) causes the force stylus to be moved downwardly and as deceleration forces are overcome the spring unit 46 of Fig. 2 returns the stylus to its final or steady load application position. A comparison of the two lines scribed on the chart by the two styli are a function of the magnitude and duration of the applied load as compared to a predetermined period of consecutive time period, each period being indicated by the change in position of the stylus point as scribed on the chart.

At the end of the predetermined time period, as determined by the escapement mechanism, slightly less than one rotation of the chart drum 74, the stop pin 123 on the idler wheel 122, now rotating in the direction of the arrow 122x, strikes the contact blade 122a, separating blade 122a from contact plate 122b, which breaks the circuit between the batteries 149 and oscillator and time marker magnet coils 190 and 224.

In initially preparing the recorder mechanism the chart drum 74 is grasped and rotated clockwise, permitting contacts 122a and 122b to close. The drum is rotated until the stop pin 123 strikes the opposite side of the contact blade 122a, arresting winding of the drum and assisting in bringing contacts 122a and 122b together. The escapement slide bar is set or moved inwardly to hold escapement from operating.

The trigger hub was, of course, rotated anti-clockwise to release contact strip 160 from contact 164 before the recorder unit 170 could be removed from the casing 10; also the gib 91b was released by withdrawal of the set screw 178. The spring contact blade 162 establishes contact between contact 174 and the time marker and oscillation magnet connectors when recorder unit is inserted through the window 26 into the housing 10.

Having described my invention, I claim:

1. A device for measuring the opening shock force of a parachute in descent which comprises, a housing, means at the top of said housing for connecting said device to a parachute, means yieldable axially at the bottom of said housing for yieldably attaching a load to said device, a stylus within said housing attached to said yieldable means and movable axially therewith, a chart within said housing having its surface pressed against said stylus, means to uniformly move said chart transversely of the movement of said stylus, a second stylus mounted within the housing in yieldable contact with said chart and an electromagnetic means mounted within the housing and connected to the second stylus for oscillating said second stylus at a predetermined uniform rate transversely to the direction of movement of the chart.

2. In a parachute tensiometer device, a tubular housing, closure means therefor at one end for connection to a parachute, closure means at the opposite end for attachment to a load to be lowered, one of which closure means being movable axially of the housing, spring means within the housing for resisting axial movement of the last mentioned closure means, a transverse partition in the housing intermediate the spring means and the first mentioned closure means, said partition having an opening therethrough, yieldable stylus mounting means fixed to the axially movable closure means and extending through and beyond the opening, a stylus fixed to said stylus mounting means and projecting toward the axis of the housing substantially perpendicular to the direction of movement of the movable closure means, a chart drum support mounted on said partition, and a rotatable chart drum thereon having a recording surface in scribing engagement with the point of the stylus, spring driven escapement means mounted on said drum support for rotating the chart drum uniformly while the stylus point is in engagement with the recording surface of the drum, releasable latching means on the escapement support restraining the escapement from operation, means for releasing said latching means including static pull cord connected at one end to the latching means for release actuation thereof and adapted to be connected at its other end to the parachute, a second stylus mounting means supported on said partition including a second stylus member pivotally mounted thereon for oscillation on an axis at one side of the chart drum perpendicular to the direction of movement of the recording surface, having its scribing end in scribing engagement with the recording surface in spaced relation to the first mentioned stylus, in a common plane perpendicular to the direction of travel of the recording surface, balanced electro-magnet means carried by said partition for rocking said second stylus in one of its oscillatory directions, spring means between the second stylus mounting means member and a second stylus support for rocking the second stylus support in the opposite oscillatory direction, balanced oscillatory circuit making and breaking contact means carried within the housing including an electrical power source and comprising a support fixed within the housing, a pair of inter-connected oppositely rotatable armatures mounted thereon, magnet means carried by the last mentioned support for rotating said armatures oppositely in one direction, spring means operable between the support and at least one of the armatures, tensioned by rotation of the armatures oppositely in one direction for rotating the same in reverse opposite directions, a make and break contact member and a connected energizing circuit connected to the electrical power source and the last mentioned magnet means for making and breaking the circuit therein, and actuating means operable by said armatures for closing the contact member to close the circuit to the last mentioned magnet means when the armatures are rotated oppositely in one direction, away from the magnet means and to break the circuit when the armatures are rotated in the opposite direction toward the last mentioned magnet means.

3. In a tensiometer device for measuring and recording opening shock force and time duration of a parachute during opening deployment and descent thereof comprising a housing, means at the top of the housing for attaching said device to a parachute, axially yieldable resilient means in the bottom of the housing for attaching a load to said device, a load recording stylus within the housing connected to the axially yieldable resilient means for movement therewith, a recording chart movable within the housing transversely to the direction of movement of the load recording stylus with its surface pressed against said load recording stylus, means within the housing to impart said movement to said chart, including an escapement mechanism for controlling the rate of movement of the recording chart at a predetermined uniform rate while the chart is in contact with said force measuring stylus, a second stylus mounted within said housing to engage said recording chart immediately above the point engaged by the load recording stylus, mounting and oscillating means in said housing for mounting and oscillating said second stylus uniformly in a direction transversely to the direction of movement of said recording chart comprising an electro-magnet having a core, and an armature therefor pivoted for rocking movement transverse to the direction of movement of the recording chart, and connected at its free end to the second stylus for oscillation thereof, said armature being movable toward said core when said electro-magnet is energized and means rocking the armature in the opposite direction when the electro-magnet is de-energized and an oscillatory make and break device including an energizing circuit having a make and break device and the electro-magnet connected therein in parallel, adapted to control the energizing and de-energizing of the aforesaid electro-magnet for rocking said armature and the second stylus at a predetermined rate during movement of the chart.

4. Apparatus as claimed in claim 3, wherein the make and break device comprises an electro-magnet having a core, a pair of similar armature disks therefor having armature portions and pivoted for oscillation within the housing on spaced axes parallel to the direction of pull at the opposite ends of housing between the parachute and the load, reverse oscillation coupling means connected between the disks for effecting simultaneous oscillation of the disks about their respective axes in opposite directions, spring means operable between the housing and at least one of the armature disks for urging rotation thereof in one direction to displace the armature portion of the disks away from the last mentioned electro-magnet core, said make and break circuit contact means being mounted within the housing in the circuit to the first mentioned electro-magnet, and actuating means on one of the disks for actuating said make and break circuit contact means to open the last mentioned circuit when the armature portion of the disks are rotated predetermined degrees in on direction toward the last mentioned core and to control closing of the last mentioned circuit when the disks are reversely rotated predetermined degrees by said spring means in their opposite directions, whereby the disks are balanced with respect to each other against rotative torque applied to the disks by angular rotation of the housing about the direction of pull between the upper and lower ends of the housing, when attached respectively to a parachute and a suspended load.

5. Apparatus as claimed in claim 4 in which the make and break device comprises a fixed contact member mounted within the housing having a contact thereon, a resilient contact blade having a contact thereon normally tensioned into contact with the contact of the fixed contact member, and an abutment means fixed on one of the armature disks for actuating engagement with the contact blade upon rotation thereof toward the associated armature core to separate the contacts last mentioned to break the circuit, whereby the spring means is tensioned and rotates the disks in their opposite directions to remove the abutment means and to allow the last mentioned contact to close to again energize the associated magnet core to oscillate the disks in the opposite direction, to thus rock the disks back and forth when the circuit is energized to make and break the circuit to stylus magnet means and the armature magnet means in a substantially uniform predetermined timed relation.

6. Apparatus as claimed in claim 5 including normally open switch means in said connected energizing circuit and means for closing said open switch means connected to said static pull cord to cause the open switch means to close when the static pull cord is tensioned, whereby to close said energizing circuit.

References Cited in the file of this patent

UNITED STATES PATENTS

| | | |
|---|---|---|
| 1,433,067 | Burr | Oct. 24, 1922 |
| 2,559,800 | Ryan | July 10, 1951 |